United States Patent
Liu et al.

(10) Patent No.: US 12,488,146 B2
(45) Date of Patent: Dec. 2, 2025

(54) FILTERING SENSITIVE DATA IN CLOUD NATIVE APPLICATION LOGS

(71) Applicant: International Business Machines Corporation, Armonk, NY (US)

(72) Inventors: Da Li Liu, Beijing (CN); Qi Feng Huo, Beijing (CN); Lei Li, Beijing (CN); Yuan Yuan Wang, Beijing (CN); Yan Song Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 17/699,521

(22) Filed: Mar. 21, 2022

(65) Prior Publication Data

US 2023/0297719 A1    Sep. 21, 2023

(51) Int. Cl.
*G06F 21/62*    (2013.01)
*G06F 21/31*    (2013.01)
*H04L 67/1097*    (2022.01)

(52) U.S. Cl.
CPC .......... *G06F 21/6254* (2013.01); *G06F 21/31* (2013.01); *G06F 21/6218* (2013.01); *H04L 67/1097* (2013.01)

(58) Field of Classification Search
CPC .. G06F 21/6254; G06F 21/31; G06F 21/6218; H04L 67/1097
See application file for complete search history.

(56) References Cited

U.S. PATENT DOCUMENTS

| | | | | |
|---|---|---|---|---|
| 9,454,671 | B2* | 9/2016 | Engberg | G06F 21/6218 |
| 10,762,049 | B1* | 9/2020 | Liang | G06F 8/427 |
| 10,929,415 | B1* | 2/2021 | Shcherbakov | G06F 3/04842 |
| 11,113,301 | B1* | 9/2021 | Modestino | G06F 16/1752 |

(Continued)

FOREIGN PATENT DOCUMENTS

| | | |
|---|---|---|
| CN | 116800465 A | 9/2023 |
| DE | 102012220716 A1 | 5/2013 |
| JP | 2023138909 A | 10/2023 |

OTHER PUBLICATIONS

Fu, Yuqi, et al. "Progress-based container scheduling for short-lived applications in a kubernetes cluster." 2019 IEEE International Conference on Big Data (Big Data). IEEE, 2019. (Year: 2019).*

(Continued)

*Primary Examiner* — Jung W Kim
*Assistant Examiner* — Sameera Wickramasuriya
(74) *Attorney, Agent, or Firm* — Daniel M. Yeates

(57) ABSTRACT

A computer-implemented method to limit access to sensitive information by filtering log files. The method includes deploying a first pod on a node of a cloud computing system, where the first pod includes a first container configured to run an application. The method also includes generating a first log file for the first container, where the first log file includes a set of actions performed by the application for a period of time. The method further includes filtering, by a filter, the first log file wherein the filter is configured to remove a type of sensitive data from the first log file. The method includes exporting, in response to the filtering, the first log file to the node. Advantageously, this can prevent various parties from accessing sensitive data that is contained in log files.

17 Claims, 6 Drawing Sheets

(56) References Cited

U.S. PATENT DOCUMENTS

| | | | |
|---|---|---|---|
| 2012/0072992 A1* | 3/2012 | Arasaratnam | G06F 21/602 |
| | | | 726/26 |
| 2017/0004185 A1* | 1/2017 | Zhu | G06N 20/00 |
| 2019/0034652 A1* | 1/2019 | Kludy | G06F 21/6218 |
| 2019/0243687 A1* | 8/2019 | Chen | G06F 11/3433 |
| 2020/0137097 A1 | 4/2020 | Zimmermann | |
| 2020/0159421 A1* | 5/2020 | Karumbunathan | G06F 3/0619 |
| 2020/0285772 A1 | 9/2020 | Malecki | |
| 2021/0026611 A1* | 1/2021 | Bequet | G06F 16/90344 |
| 2021/0056225 A1* | 2/2021 | Sislow | G06F 21/6227 |
| 2021/0224259 A1* | 7/2021 | Shcherbakov | G06F 16/248 |
| 2021/0297487 A1* | 9/2021 | Hegde | G06F 9/5072 |
| 2022/0156247 A1* | 5/2022 | Gururaj | G06F 16/1734 |
| 2022/0342997 A1* | 10/2022 | Watanabe | G06F 21/577 |

OTHER PUBLICATIONS

Tak, Byungchul, et al. "Understanding security implications of using containers in the cloud." 2017 USENIX Annual Technical Conference (USENIX ATC 17). 2017. (Year: 2017).*

"De-identifying sensitive data", Google Cloud, Last updated Nov. 19, 2021, 26 pages, <https://cloud.google.com/dlp/docs/deidentify-sensitive-data>.

"Filter secrets from Kubernetes logs", radu's blog, Aug. 20, 2018, 7 pages, <https://radu-matei.com/blog/filter-k8s-ogs/>.

"kubernetes / enhancements", GitHub, KEP-1753: Kubernetes system components logs sanitization, downloaded from the Internet on Nov. 30, 2021, 12 pages.

"Logging Architecture", Kubernetes, downloaded from the Internet on Feb. 14, 2022, 9 pages, <https://kubernetes.io/docs/concepts/cluster-administration/logging/>.

"Manage sensitive data with Docker secrets", Docker Documentation, downloaded from the Internet on Nov. 30, 2021, 21 pages, <https://docs.docker.com/engine/swarm/secrets/>.

Authors et. al.: Disclosed Anonymously, "Processing Logs in Real Time to Create Kubernetes Events Upon Filtered Logs", An IP.com Prior Art Database Technical Disclosure, IP.com No. IPCOM000266246D, IP.com Electronic Publication Date: Jun. 28, 2021, 7 pages.

Baer et al., "Using logging for your apps running on Kubernetes Engine", Google Cloud, May 11, 2020, 11 pages, <https://cloud.google.com/blog/products/management-tools/using-logging-your-apps-running-kubernetes-engine>.

Crosbymichael, "Shim pluggable logging #3085", GitHub, containerd / containerd, Mar. 8, 2019, 8 pages, <https://github.com/containerd/containerd/pull/3085>.

Mell et al., "The NIST Definition of Cloud Computing", Recommendations of the National Institute of Standards and Technology, Special Publication 800-145, Sep. 2011, 7 pages.

Wang, Rosemary, "Application Logging in Kubernetes with fluentd", Feb. 14, 2018, 10 pages, <https://medium.com/@joatmon08/application-logging-in-kubernetes-with-fluentd-4556f1573672>.

* cited by examiner

```
apiVersion: v1
kind: Pod
metadata:
    name: nginx-log-filters
    labels:
        name: nginx-log-filters
spec:
    containers:
        - name: nginx
          image: nginx
          imagePullPolicy: Always
          ports:
             - containerPort: 80
          logFilters:
            - name: url-filter
                filterProviderPath: url-filter
            - name: mail-filter
                filterProviderPath: mail-filter
```

FIG. 6A

```
name: simple-filter
logAttributesToReplace:
- ([a-f0-9]{8}(-[a-f0-9]{4}){4}[a-f0-9]{8}) = [UUID Removed]
attributeToReplaceNewValues:
- SecretWord=[words be Removed]
```

FIG. 6B

FILTERING SENSITIVE DATA IN CLOUD NATIVE APPLICATION LOGS

BACKGROUND

The present disclosure relates to cloud computing, and, more specifically, filtering sensitive information from cloud native application logs.

Most modern applications include a logging mechanism. The logs can track and record actions that occur within the application during operation. Logs are particularly useful for troubleshooting issues and for monitoring cluster activity. For example, a single application can generate a standard output log and a standard error stream log. Each log can be configured to record a set of data, based on the configuration of the application. The standard output log can include information about usage patterns, activities, operating system operation, server operations, application usage, and the like. Error logs can record errors encountered by the application that prevent correct execution or indicate exception handling. The data can include corrupted/missing files/tables, configuration errors, and other similar data.

Containers and container orchestration are utilized to effectively and efficiently accomplish cloud computing tasks. A container is a ready to run software package that can be sent from a host and run on a node. Each container can include all features required to run an application. The container can be imaged onto any set of hardware that is capable of running the software included in a container. Each container is included in a pod. Each pod can include more than one container. In some embodiments, pods can be defined as a self-contained deployable unit managed by a container orchestration solution. Containers and/or cloud native applications can output one or more logs in one or more log streams.

In current systems, when a container outputs a log file, the log file can include sensitive data and/or other data that the data owner wants to keep private. The log files get stored outside of the pod and container within the system storage of the node on which the container is running. While stored on the node, the data can potentially be accessed by containers operating in different pods on the same node and/or by a user account that has access to view data, in particular log files, stored on the node. Thus, the sensitive data in logs files can potentially be accesses by parties who otherwise do not have access to or permission to view the data. There is a need to reduce or eliminate the possibility of the sensitive data in log files being viewed by unauthorized parties.

SUMMARY

Disclosed is a computer-implemented method to limit access to sensitive information by filtering log files. The method includes deploying a first pod on a node of a cloud computing system, wherein the first pod includes a first container configured to run an application. The method also includes generating a first log file for the first container, wherein the first log file includes a set of actions performed by the application for a period of time. The method further includes filtering, by a filter, the first log file, wherein the filter is configured to remove a type of sensitive data from the first log file. The method includes exporting, in response to the filtering, the first log file to the node. Advantageously, this can prevent various parties from accessing sensitive data that is contained in log files.

Additionally, the method can be configured where the filter includes one or more providers, and a first provider is configured to remove the type of sensitive data, and a second provider is configured to remove a second type of sensitive data. This allows for the filtering of multiple log types and for multiple types of sensitive data. Another optional feature is where the filter includes a user interface configured to receive, from a data owner, one or more filter scripts wherein each filter script is configured to remove a type of data from the first log file.

Advantageously, this allows a data owner to define and update the types of data to be removed from various log files. Further aspects of the present disclosure are directed to computer program products containing functionality consistent with the method described above.

Further disclosed is a system for filtering log files. The system comprises a processor and, a node of a cloud computing system configured to operate one or more pods received from one or more hosts, and a computer-readable storage medium communicatively coupled to the processor and storing program instructions which are executed by the processor. The program instructions, when executed by the program instructions, are configured to cause the processor to receive a first pod to the node of a cloud computing system. The first pod includes a first container configured to run an application. The first pod also generates a first log file for the first container, wherein the first log file includes a set of actions performed by the application for a period of time. Further, the first pod filters, by a filter, the first log file, wherein the filter is configured to remove a type of sensitive data from the first log file. Also, the first pod exports, in response to the filtering of the first log file, the first log file to the node. Advantageously, the system can prevent or limit the chance that a third party can access sensitive data stored in log files because the sensitive data is removed.

The present Summary is not intended to illustrate each aspect, every implementation, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 6A illustrates one embodiment of a file to generate a container with a log filter.

FIG. 6B illustrates one embodiment of a filter that can be applied to a log file.

DETAILED DESCRIPTION

Cloud Computing in General

Figure 1:
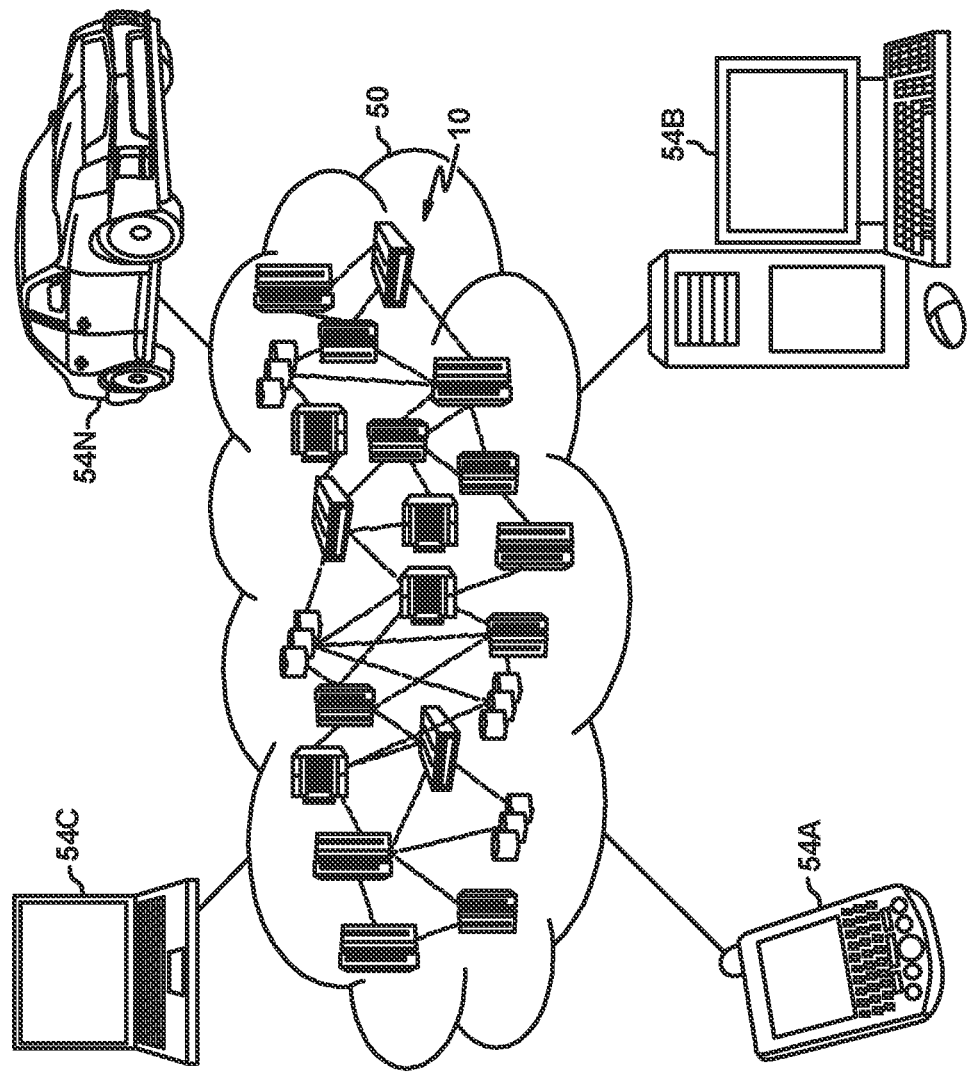
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
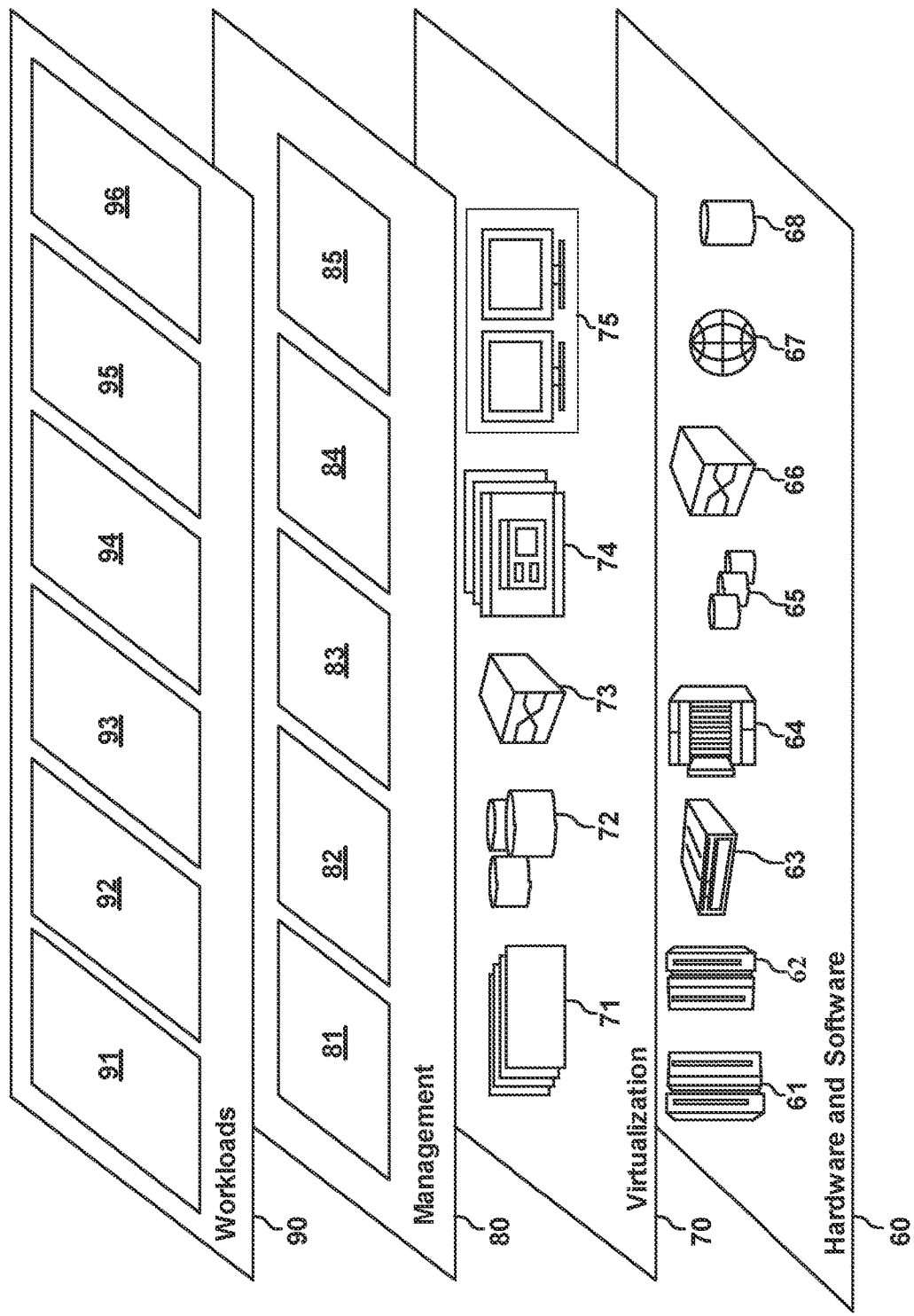
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and log file filtering 96.

Data Processing System in General

Figure 3:
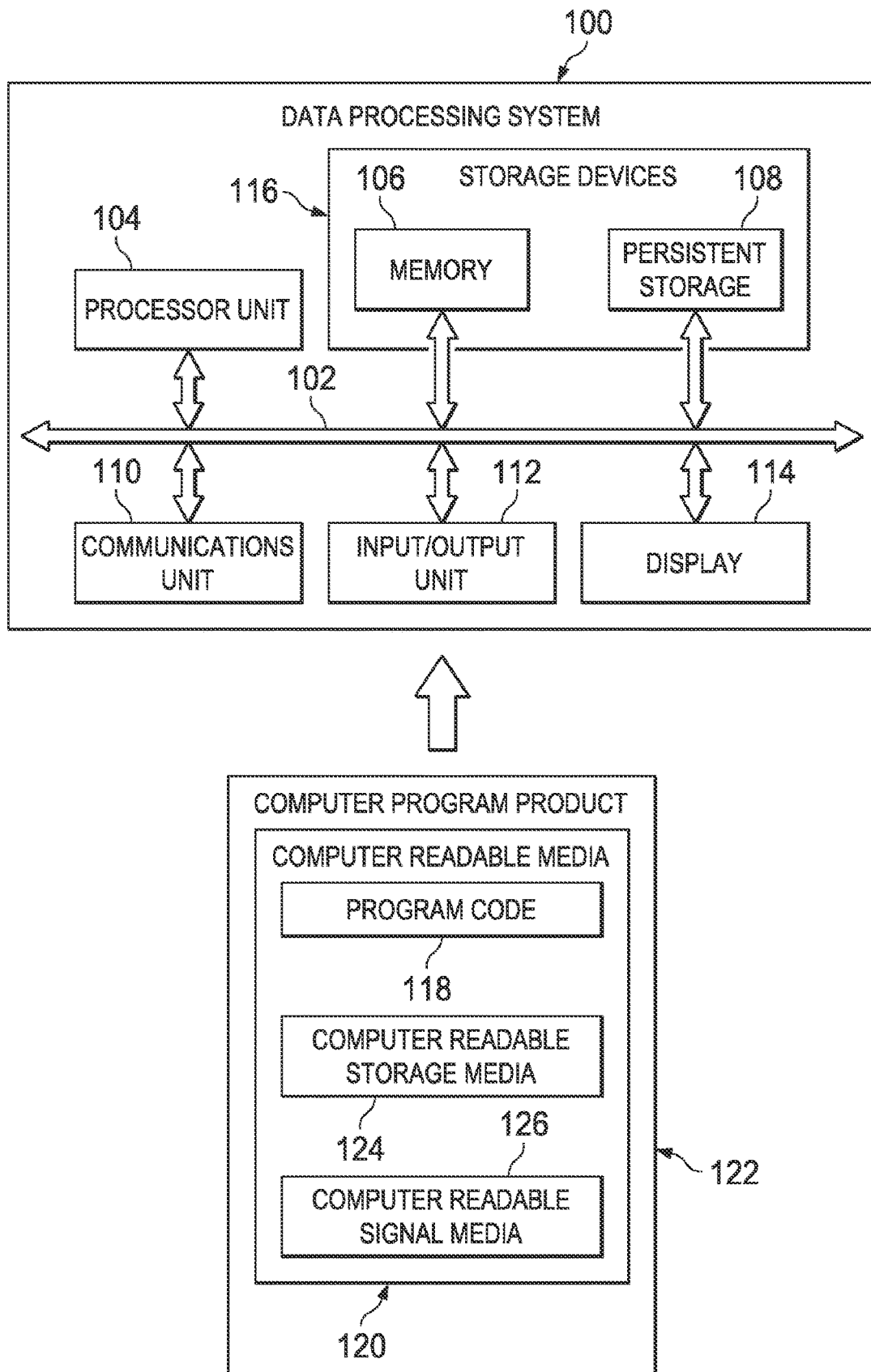
FIG. 3 is a block diagram of a Data Processing System (DPS) according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

The present disclosure relates to cloud computing, and, more specifically, filtering sensitive information from cloud native application logs. While the present disclosure is not necessarily limited to such applications, various aspects of the disclosure may be appreciated through a discussion of various examples using this context.

Most modern applications include a logging mechanism. The logs can track and record actions that occur within the application during operation. Logs are particularly useful for troubleshooting issues and for monitoring cluster activity. Various applications can generate multiple log types and any number of separate logs. For example, a single application can generate a standard output log and a standard error stream log. Each log can be configured to record a set of data (not mutually exclusive) based on the configuration of the application. The standard output log can include information about usage patterns, activities, operating system operation, server operations, application usage, and the like. Error logs can record errors encountered by the application that prevent correct execution The data can include corrupted/missing files/tables, configuration errors, and other similar data.

Containers and container orchestration are utilized to effectively and efficiently accomplish cloud computing tasks. A container is a ready to run software package that can be sent from a host and run on a node. Each container can include all features required to run an application. The container can be imaged onto any set of hardware that is capable of running the software included in a container. Each container is included in a pod. Each pod can include more than one container. In some embodiments, pods can be defined as a self-contained deployable unit managed by a container orchestration solution.

A container orchestration solution (a "container manager") can be designed to distribute containers/pods onto one or more remote computing nodes (or "nodes"). Various embodiments allow for constraints and/or rules that dictate how and when pods are distributed and executed on one or more different nodes. The distribution can be based on several factors. The factors can include CPU type, node type, disk type, node hardware, pod configuration, node configuration, and other similar factors.

Applications run within containers can also generate the various log files. As part of the cloud native architecture for the various application, the log files are stored on the nodes. While on the node, the log can be accessible to other containers located on the same host and/or by various user accounts with appropriate permission levels. At times, there can be sensitive, secret, or other data that a data owner wants to keep private.

Embodiments of the present disclosure include a log filter. Embodiments of the present disclosure can limit access to any type of data when the data may be otherwise accessible. It provides the data owner an opportunity to have greater control of their data to comply with organizational and/or governmental regulations. Thus, it can make cloud computing more secure.

Embodiments of the present disclosure can include a log manager. The log manager can be configured to generate and/or filter one or more log types for an application running in a container. In some embodiments, the log manager can include one or more log filters. The log filter can be implemented to remove any data the data owner does not want others to access prior to the log being stored on the node. In some embodiments, the log filter can be built into the application container. In some embodiments, the filter can be built as a sidecar container. Any number of unique filters can be added to a filtering module to remove any type of data. In some embodiments, there can be the same and/or different filters for different log types.

The aforementioned advantages are example advantages, and embodiments exist that can contain all, some, or none of the aforementioned advantages while remaining within the spirit and scope of the present disclosure.

Figure 4:
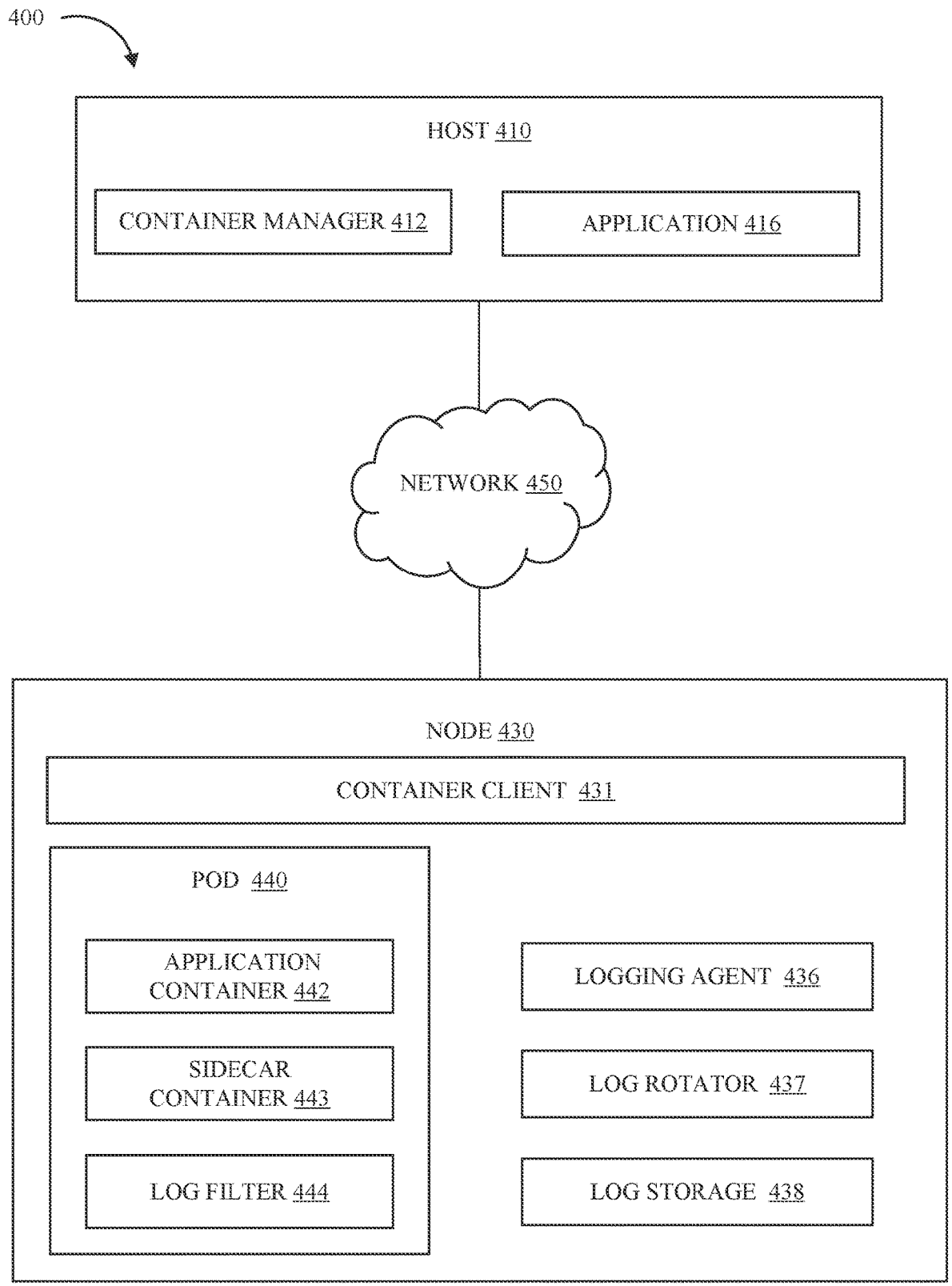
FIG. 4 illustrates a functional diagram of a computing environment suitable for operation of a log file filter in accordance with some embodiments of the present disclosure.

Referring now to various embodiments of the disclosure in more detail, FIG. 4 is a representation of a computing environment 400, that is capable of running a container client in accordance with one or more embodiments of the present disclosure. Many modifications to the depicted environment may be made by those skilled in the art without departing from the scope of the disclosure.

Computing environment 400 includes host 410, node 430, and network 450. Network 450 can be, for example, a telecommunications network, a local area network (LAN), a wide area network (WAN), such as the Internet, or a combination of the three, and can include wired, wireless, or fiber optic connections. Network 450 may include one or more wired and/or wireless networks that are capable of receiving and transmitting data, voice, and/or video signals, including multimedia signals that include voice, data, and video information. In general, network 450 may be any combination of connections and protocols that will support communications between host 410, node 430, and other computing devices (such as additional nodes that are not shown) within computing environment 400. In some embodiments, each of host 410, and/or node 430 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes container manager 412, and application 416.

Container manager 412 can be any combination of hardware and/or software configured to operate the lifecycle of containers (e.g., application container 442). In some embodiments, container manager 412 controls and automates tasks including, but not limited to, provisioning and deployment of containers, redundancy and availability of containers, allocation of resources between containers, movement of containers across a host infrastructure, and load balancing between containers and/or nodes 430. In some embodiments, container manager 412 includes a container orchestration system (e.g., Kubernetes®). In some embodiments, applications 416 are included in container manager 412. They are shown separately for description purposes. In some embodiments, container manager 412 identifies pods and distributes the pods to a node. The identified pods can be newly created pods and/or terminated/failed pods (e.g., node failure).

Application 416 can be any combination of hardware and/or software configured to carry out a function on a computing device (e.g., host 410). In some embodiments, application 416 is a web application. In some embodiments, application 416 can be packaged in one or more pods. In some embodiments, application 416 can represent any number of separate applications. The applications can be combined/grouped into one or more pods or containers. In some embodiments, application 416 can initiate the generation of a pod.

Node 430 can be any combination of hardware and/or software configured to run one or more pods. In some embodiments, node 430 can be a standalone computing device, a management server, a web server, a mobile computing device, or any other electronic device or computing system capable of receiving, sending, and processing data. In some embodiments, node 430 can represent a server computing system utilizing multiple computers as a server system, such as in a cloud computing environment. In some embodiments, node 430 can support two or more pods from two or more different hosts. The two hosts can be managed by different parties that utilize node 430. In some embodiments, computing environment 400 can include one or more additional nodes. The additional nodes can be consistent with node 430 and can support pods/containers from various hosts. All the pods can be managed by a common container management program. In some embodiments, node 430 includes container client 431, logging agent 436, log rotator 437, log storage 438, and pod 440.

Container client 431 can be any combination of hardware and/or software configured to run a container on a node. In some embodiments, container client 431 works complementarily with container manager 412. Container client 431 can be a node agent that runs on each node and/or a container runtime agent (e.g., Kubelet® as an agent to Kubernetes®). Container client 431 can interface with container manager 412 to receive and execute containers as instructed by container manager 412. Container client 431 can receive one or more pods from container manager 412 and/or a computing device separate from host 410.

Logging agent 436 can be any combination of hardware and/or software configured to generate and record log files. In some embodiments, the logs are stored in log storage 438. In some embodiments, logging agent 436 can be node level and/or cluster level (a cluster of nodes). In some embodiments, logging agent 436 generates logs based on instructions included with the application container 442 and/or container client 431.

Log rotator 437 can be any combination of hardware and/or software configured to rotate logs. In some embodiments, log rotator 437 can remove old logs. Removing/rotating the logs can limit the amount of storage the logs use. In some embodiments, the logs can be rotated based on instruction from the application, the pod, and/or the container. The rotation can be continuous (e.g., keeps a fixed number of log cycles), and or occur after a predetermined event. The event can be a period of time, a number of cycles, an error, initiation/closing of a pod or container, and the like.

Log storage 438 can be a set of one or more log files that are currently stored on node 430. There can be any number of individual files. In some embodiments, log storage 438 includes logs for all or some of the containers/pods running on node 430. Each application can have a unique log stream. In some embodiments, log storage 438 can include two or more types of logs. For example, there can be a standard output log and an error log for each application. In some embodiments, log storage 438 can be accessible to appropriate credentialed accounts on node 430 and/or to any container location on node 430. In some embodiments, log storage 438 includes filtered log files. In some embodiments, log storage 438 is located on node 430 outside of any containers and/or pods operation on node 430.

Pod 440 can be a virtual structure configured to transfer containers between a host (e.g., host 410) and a node (e.g., node 430). In some embodiments, a pod can include one or more containers. In the depicted embodiment, pod 440 includes container client 431, application container 442, sidecar container 443, and log filter 444.

Application container 442 can be any combination of hardware and/or software configured to run an application on a remote node. A container can be a software package that includes the necessary instructions and/or data to perform a specified task. It can include a runtime, all system libraries, and application libraries needed to fully accomplish the task of the application. In some embodiments, application container 442 is configured to generate one or more log types. The log types can include a standard output log, an error log, and other similar logs. Each log can include relevant information about operation of the application whin application container 442. In some embodiments, the log file includes a set of actions performed by the application for a period of time. The period of time can be based on a time, on a number of actions, and/or on a size of the file. For example, each log file can have a similar amount of data.

Sidecar container 443 can be any combination of hardware and/or software configured to provide additional functionality to application container 442. Sidecar container 443 can extend and/or enhance the functionality of application container 442 without having to change/update application container 442. In some embodiments, sidecar container 443 can be configured to run in the same pod as application container 442. In some embodiments, sidecar container 443 can include one or more of logging agent 436 and log rotator 437. In some embodiments, sidecar container 443 can be a streaming container. A streaming container can be configured to stream data for application container 442 and/or application 416. In some embodiments, sidecar container 443 can include log filter 444. Pod 440 can include any number of sidecar containers configured to run with application container 442.

Log filter 444 can be any combination of hardware and/or software configured to remove data from a log file. In some embodiments, the data can be sensitive data. Sensitive data can be any data the data owner deems as sensitive. Sensitive data can include usernames, passwords, emails, application data, specific words, workload data, and other types of data.

In some embodiments, log filter 444 can include one or more different providers. Each provider can identify and filter a different type/piece of data. Log filter 444 can pass the log file through each provider in a series. In some embodiments, each provider can include a script configured to identify a piece of data and remove/change that piece of data. In some embodiments, each provider each filter script can identify a type of sensitive data and replace the type of sensitive data with a generic value. The generic value can null value, a specific work indicating the filtering (e.g., placing "REMOVED" in the log), or a generic term (e.g., placing "EMAIL ADDRESS" in the log). In some embodiments, log filter 444 outputs the log file with filtered data, or outputs a filtered log.

In some embodiments, log filter 444 can be implemented at any point before the log file is saved on node 430. Log filter 444 can be implemented on the output of application container 442 and/or on the output of pod 440. The output of application container 442 can be an input to sidecar container 443. In some embodiments, log filter 444 can be utilized by adding a log filter driver to a Yet Another Markup Language "YAML" file that defines the container. A YAML file can be a file in human readable form that is suited to create configuration files (e.g., for a container) The driver can be instruction on name and path to find the filter and/or the provider.

Figure 5:
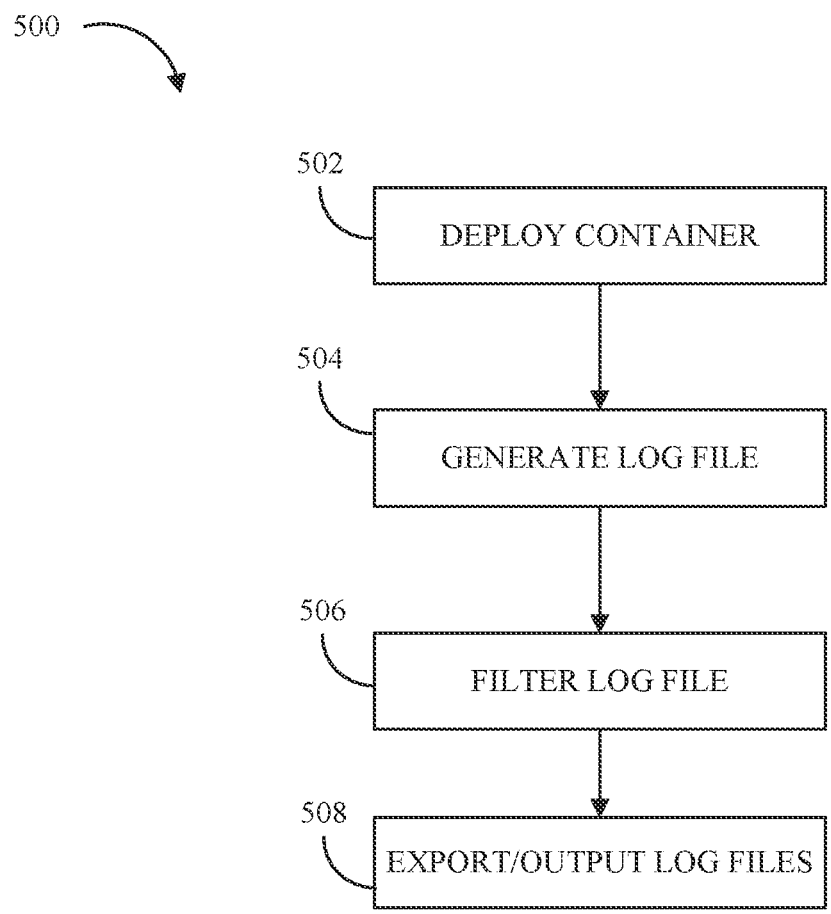
FIG. 5 illustrates a flow chart of an example method to filter log files in accordance with some embodiments of the present disclosure.

FIG. 5 depicts a flowchart of an example method, method 500, for filtering log files that can be performed in a computing environment (e.g., computing environment 400 and/or cloud computing environment 50). One or more of the advantages and improvements described above for filtering log files may be realized by method 500, consistent with various embodiments of the present disclosure.

Method 500 can be implemented by one or more processors, host 410, container manager 412, application 416, node 430, container client 431, logging agent 436, log rotator 437, log storage 438, pod 440, application container 442, sidecar container 443, log filter 444 and/or a different combination of hardware and/or software. In various embodiments, the various operations of method 500 are performed by one or more of host 410, container manager 412, application 416, node 430, container client 431, logging agent 436, log rotator 437, log storage 438, pod 440, application container 442, sidecar container 443, log filter 444. For illustrative purposes, the method 500 will be described as being performed by container client 431.

At operation 502, container client 431 deploys a container on a node (e.g., node 430). In some embodiments, the container is deployed in a pod. The pod can include additional containers and/or one or more sidecar containers. In some embodiments, the node on which the container is deployed includes at least one additional pod. The additional pod can be deployed from a second/alternate host. The additional pod can be managed by a different organization than the pod. In some embodiments, the additional pod can be based on a separate YAML file. In some embodiments, they can be accesses by one or more authorized accounts. The access can retrieve data stored outside of pods/containers.

In some embodiments, operation 502 includes defining one or more filters. The filter can include one or more providers. The filters can include log filter instructions with the container/pod. The instructions can be included in a YAML file for the container.

At operation 504, container client 431 generates a log file. In some embodiments, container client 431 generates two or more streams of log files. There can be a standard log, an error log, and any number of additional logs. The stream can include generating a sequence of logs. The logs can include relevant information about operation of the application. In some embodiments, there can be a separate output for each of the types of log files.

At operation 506, container client 431 filters the log file. The log file can be filtered before it exits the pod and/or before it is stored on the node. In some embodiments, the filter is implemented as an output of the container. The filter can be before an input to a sidecar container. In some embodiments, the filter is implemented at the outlet of the pod.

In some embodiments, log file passes through a filtering component (e.g., log filter 444). The filtering component can have one or more providers. Each provider can be configured to identify and remove a type of data. The type can be a general type, a specific word, or the like. For example, the types can include an email address, username, password, secret words, security information, names, dates, and the like. In some embodiments, the log file passes through each provider in a sequence. For example, an output of the first provider is the input of the second provider, the second to the third, and so on. After the last provider in the series, the filtered log is output. In some embodiments, each log stream has an input and an output to the filtering component. In some embodiments, each log stream passes through the same filtering component and all of the same providers. In some embodiments, each log stream can pass through a different set of providers. Each set can have some overlap. For example, the standard log stream can go through filters A and B, and the error log stream through providers A and C.

At operation 508, container client 431 exports the log files. In some embodiments, the exported log files are filtered such that if they are accessed by a different pod and/or an authorized user for the node, there is no exposure of any data that has been filtered out. The logs can still be used for troubleshooting, error correction, and all other standard functions for logs.

FIG. 6A includes file 600. File 600 includes one embodiment of a YAML file to generate a pod with the filter capabilities. FIG. 6B includes filter 650. Filter 650 includes one embodiment of a filter that can be applied to a log file. Filter 650 can remove and replaces various portions of the log file to protect them from unwanted access.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In summary, various embodiments have been discussed which are again specified in the following numbered clauses:

Clause 1 is as follows. A computer-implemented method comprising, deploying a first pod on a node of a cloud computing system, wherein the first pod includes a first container configured to run an application; generating a first log file for the first container, wherein the first log file includes a set of actions performed the application for a period of time; filtering, by a filter, the first log file wherein the filter is configured to remove a type of sensitive data from the first log file; and exporting, in response to the filtering, the first log file to the node.

Clause 2 is as follows. The method of clause 1, wherein the exporting includes storing the first log file on the node.

Clause 3 is as follows. The method of clause 1 or 2, wherein a second container in the second pod can access data stored on the node.

Clause 4 is as follows. The method of any of the preceding clauses, wherein a second container in the second pod can access data stored on the node.

Clause 5 is as follows. The method of any of the preceding clauses, wherein the first log file stored on the node is accessible to a user account for the node.

Clause 6 is as follows. The method of any of the preceding clauses, the method further comprising: generating a second log file, wherein the first log file is a standard output log and the second log file is a standard error log.

Clause 7 is as follows. The method of any of the preceding clauses, wherein the filter includes one or more providers, and a first provider is configured to remove the type of sensitive data, and a second provider is configured to remove a second type of sensitive data.

Clause 8 is as follows. The method of any of the preceding clauses, wherein the first log file and the second log file are filtered by a common set of providers.

Clause 9 is as follows. The method of any of the preceding clauses, wherein the first log file is filtered by the first provider and the second log file is filtered by the second provider.

Clause 10 is as follows. The method of any of the preceding clauses, wherein the filter includes a user interface configured to receive, from a data owner, one or more filter scripts wherein each filter script is configured to remove a type of data from the first log file.

Clause 11 is as follows. The method of any of the preceding clauses, wherein the each filter script can identify a type of sensitive data and replace the type of sensitive data with a generic value.

Clause 12 is as follows. A system comprising: a processor; a node of a cloud computing system configured to operate one or more pods received from one or more hosts; and a computer-readable storage medium communicatively coupled to the processor and storing program instructions which, when executed by the processor, are configured to cause the processor to: receive a first pod to the node of a cloud computing system, wherein the first pod: includes a first container configured to run an application; generates a first log file for the first container, wherein the first log file includes a set of actions performed the application for a period of time; filters, by a filter, the first log file wherein the filter is configured to remove a type of sensitive data from the first log file; and export, in response to the filtering of the first log file, the first log file to the node.

Clause 13 is as follows. The system according to clause 12 wherein the node is configured to store a set of log files generated on the node, include the first log file in response to the export of the first log file.

Clause 14 is as follows. The system according to the clauses of 12 and 13, wherein the node is operating a second pod from a second host, and a second container in the second host can access the set of log files.

Clause 15 is as follows. The system according to the clauses 12 to 14 wherein the set of log files is accessible to an account authorized to access the node.

Clause 16 is as follows. The system according to the clauses 12 to 15 wherein the filter includes a series of two or more filter scripts, and each filter script is configured to remove a different type of data from the first log.

Clause 17 is as follows. A computer program product, the computer program product comprising a computer readable storage medium having program instructions embodied therewith, the program instructions executable by a processing unit to cause the processing unit to: deploy a first pod on a node of a cloud computing system, wherein the first pod includes a first container configured to run an application; generate a first log file for the first container, wherein the first log file includes a set of actions performed the application for a period of time; filter, by a filter, the first log file wherein the filter is configured to remove a type of sensitive data from the first log file; and export, in response to the filtering, the first log file to the node.

Clause 18 is as follows. The computer program product according to clause 17, wherein the program instructions are further configured to cause the processing unit to: generate a second log file, wherein the first log file is a standard output log and the second log file is a standard error log.

Clause 19 is as follows. The computer program product of clauses 17 and 18, wherein the filter includes one or more providers, and a first provider is configured to remove the type of sensitive data, and a second provider is configured to remove a second type of sensitive data.

Clause 20 is as follows. The computer program product of clauses 17 to 19, wherein the first log file and the second log file are filtered by a common set of providers.

What is claimed is:

1. A computer-implemented method comprising:
    deploying a first pod on a node of a cloud computing system, wherein the first pod includes a first container configured to run an application and the node is contained within a computing device;
    deploying a second pod on the node within the computing device;
    generating a first log file for the first container, wherein the first log file includes a set of actions performed by the application for a period of time;
    filtering, by a filter, the first log file wherein the filter is configured to remove a type of sensitive data from the first log file;
    exporting, from the first pod and in response to the filtering, the first log file to a log storage on the node, wherein the log storage is outside of the first pod wherein a second container in the second pod can access the log storage on the node; and
    rotating, in response to an event, the first log file from the log storage, wherein the event is closing the first pod and the rotating includes removing the first log file from the node.

2. The computer-implemented method of claim 1, wherein the exporting includes storing the first log file in the log storage.

3. The computer-implemented method of claim 1, wherein the first log file stored in the log storage is accessible to a user account for the node.

4. The computer-implemented method of claim 1, further comprising:
    generating a second log file, wherein the first log file is a standard output log and the second log file is a standard error log.

5. The computer-implemented method of claim 4, wherein the filter includes one or more providers, and a first provider is configured to remove the type of sensitive data, and a second provider is configured to remove a second type of sensitive data.

6. The computer-implemented method of claim 5, wherein the first log file and the second log file are filtered by a common set of providers.

7. The computer-implemented method of claim 5, wherein the first log file is filtered by the first provider and the second log file is filtered by the second provider.

8. The computer-implemented method of claim 1, wherein the filter includes a user interface configured to receive, from a data owner, one or more filter scripts, wherein each filter script is configured to remove a different type of sensitive data from the first log file.

9. The computer-implemented method of claim 8, wherein the each filter script can identify the different type of sensitive data and replace the different type of sensitive data with a generic value.

10. A system comprising:
a processor;
a node of a cloud computing system configured to operate a plurality of pods received from one or more hosts, wherein the node is contained within a computing device, and the node includes a log storage; and
a computer-readable storage medium communicatively coupled to the processor and storing program instructions which, when executed by the processor, are configured to cause the processor to:
receive a first pod of the plurality of pods to the node of a cloud computing system, wherein the first pod:
includes a first container configured to run an application;
generates a first log file for the first container, wherein the first log file includes a set of actions performed the application for a period of time;
filters, by a filter, the first log file wherein the filter is configured to remove a type of sensitive data from the first log file; and
export, from the first pod and in response to the filtering of the first log file, the first log file to the log storage, wherein the log storage is outside of the first pod;
receive a second pod of the plurality of pods to the node of the cloud computing system, wherein a second container in the second pod can access the log storage on the node; and
rotate, in response to an event, the first log file from the log storage, wherein the event is closing the first pod and the rotating includes removing the first log file from the node.

11. The system of claim 10, wherein the node is configured to store a set of log files generated on the node, include the first log file in response to the export of the first log file.

12. The system of claim 11, wherein the set of log files is accessible to an account authorized to access the node.

13. The system of claim 10, wherein the filter includes a series of two or more filter scripts, and each filter script is configured to remove a different type of data from the first log file.

14. A computer program product, the computer program product comprising a computer readable storage medium having program instructions embodied therewith, the program instructions executable by a processing unit to cause the processing unit to:
deploy a first pod on a node of a cloud computing system, wherein the first pod includes a first container configured to run an application and the node is contained within a computing device;
deploy a second pod on the node within the computing device;
generate a first log file for the first container, wherein the first log file includes a set of actions performed the application for a period of time;
filter, by a filter, the first log file wherein the filter is configured to remove a type of sensitive data from the first log file;
export, from the first pod and in response to the filtering, the first log file to a log storage on the node, wherein the log storage is outside of the first pod wherein a second container in the second pod can access the log storage on the node; and
rotate, in response to an event, the first log file from the log storage, wherein the event is closing the first pod and the rotating includes removing the first log file from the node.

15. The computer program product of claim 14, wherein the program instructions are further configured to cause the processing unit to:
generate a second log file, wherein the first log file is a standard output log and the second log file is a standard error log.

16. The computer program product of claim 15, wherein the filter includes one or more providers, and a first provider is configured to remove the type of sensitive data, and a second provider is configured to remove a second type of sensitive data.

17. The computer program product of claim 16, wherein the first log file and the second log file are filtered by a common set of providers.

\* \* \* \* \*